US007710823B2

(12) United States Patent
Tabarovsky et al.

(10) Patent No.: US 7,710,823 B2
(45) Date of Patent: May 4, 2010

(54) RESISTIVITY MEASUREMENT THROUGH METAL CASING USING MAGNETIC FIELD AND MAGNETOACOUSTIC PHENOMENA

(75) Inventors: Leonty A. Tabarovsky, Cypress, TX (US); Vitaly N. Dorovsky, Novosibirsk (RU); Yuriy A. Nefedkin, Novosibirsk (RU); Kholmatzhon Imomnazarov, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 499 days.

(21) Appl. No.: 11/696,461

(22) Filed: Apr. 4, 2007

(65) Prior Publication Data

US 2008/0247270 A1  Oct. 9, 2008

(51) Int. Cl.
*G01V 1/00* (2006.01)
*G01V 3/00* (2006.01)
(52) U.S. Cl. .................................. 367/35; 324/333
(58) Field of Classification Search .............. 367/25, 367/27, 35; 181/102, 105; 702/7; 324/333, 324/337–338, 345–346, 351, 353, 355, 368, 324/371
See application file for complete search history.

(56) References Cited

U.S. PATENT DOCUMENTS

| 3,354,983 | A | * | 11/1967 | Erickson et al. | 367/140 |
|---|---|---|---|---|---|
| 4,820,989 | A |  | 4/1989 | Vail, III | 324/368 |
| 4,882,542 | A |  | 11/1989 | Vail, III | 324/368 |
| 5,043,669 | A |  | 8/1991 | Vail, III | 324/368 |
| 5,043,688 | A |  | 8/1991 | Castonguay et al. | 335/172 |
| 5,075,626 | A |  | 12/1991 | Vail, III | 324/368 |
| 5,187,440 | A |  | 2/1993 | Vail, III | 324/372 |
| 5,223,794 | A |  | 6/1993 | Vail, III | 324/368 |
| 5,486,764 | A | * | 1/1996 | Thompson et al. | 324/323 |
| 6,353,321 | B1 |  | 3/2002 | Bittar |  |
| 6,850,168 | B2 |  | 2/2005 | Tang et al. | 340/854.4 |
| 2005/0067191 | A1 |  | 3/2005 | Miyamoto et al. |  |
| 2005/0122116 | A1 |  | 6/2005 | Yu et al. |  |
| 2007/0211572 | A1 | * | 9/2007 | Reiderman et al. | 367/35 |

OTHER PUBLICATIONS

S. T. Chen et al.; *Compressional and shear-wave logging in open and cased holes*, Geophysics, vol. 56, No. 3, Apr. 1991, pp. 550-557, 14 Figs.
Jong S. Lee et al.; "Propagation of Rayleigh Waves in Magneto-Elastic Media," Transactions of the ASME, vol. 59, Dec. 1992, pp. 812-818.
L. Knopoff; "The Interaction Between Elastic Wave Motions and a Magnetic Field in Electrical Conductors," Journal of Geophysical Research, vol. 60, No. 4, 1955, pp. 44-456.
J.W. Dunkin et al.; "On the Propagation of Waves in An Electromagnetic Elastic Solid," International Journal of Engineering Science, vol. 1, 1963, pp. 461-495.
V.N. Dorovsky et al.; "A Mathematical Model for the Movement of a Conducting Liquid Through a Conducting Porous Medium," Mathl. Comput. Modeling, vol. 20, No. 7, 1994, pp. 91-97.

* cited by examiner

*Primary Examiner*—Jack W. Keith
*Assistant Examiner*—Krystine Saito
(74) *Attorney, Agent, or Firm*—Mossman Kumar & Tyler PC

(57) ABSTRACT

Measurements of acoustic velocities are made through a case borehole in the absence and presence of an applied magnetic field. A formation resistivity parameter may be estimated from differences in the acoustic velocities.

10 Claims, 7 Drawing Sheets

RESISTIVITY MEASUREMENT THROUGH METAL CASING USING MAGNETIC FIELD AND MAGNETOACOUSTIC PHENOMENA

BACKGROUND OF THE PRESENT DISCLOSURE

1. Field of the Disclosure

The present disclosure relates generally to geological exploration in wellbores. More particularly, the present disclosure describes an apparatus, a machine-readable medium, and a method useful for obtaining improved resistivity measurements downhole.

2. Description of the Related Art

A variety of techniques are currently utilized in determining the presence and estimating quantities of hydrocarbons (oil and gas) in earth formations. These methods are designed to determine formation parameters, including, among other things, the resistivity, porosity, and permeability of a rock formation surrounding a wellbore drilled for recovering the hydrocarbons. Typically, the tools designed to provide the desired information are used to log the wellbore. Much of the logging is done after the wellbores have been drilled. Moreover, a significant amount of the logging, such as in the case of resistivity measurements of the formation, is done after the wellbores have been cased. Typically the casing is made of an electrically conductive metal.

The oil industry has long sought to measure resistivity through casing. Such resistivity measurements are useful for at least the following purposes: locating bypassed oil and gas; reservoir evaluation; monitoring water floods; measuring quantitative saturations; cement evaluation; permeability measurements; and measurements through a drill string attached to a drilling bit. Therefore, measurements of resistivity through metallic pipes, and steel pipes in particular, are an important subject in the oil industry. See, for example, U.S. Pat. No. 4,820,989; U.S. Pat. No. 4,882,542; U.S. Pat. No. 5,043,688; U.S. Pat. No. 5,043,669; U.S. Pat. No. 5,075,626; U.S. Pat. No. 5,187,440; and U.S. Pat. No. 5,223,794 (Ser. No. 07/754,96). Resistivity measurements of the formation that are conducted through an electrically conductive metal casing present significant challenges. In particular, the very small magnitudes of the measured resistivity signals obtained via current existing galvanic methodologies represent critical problems. When using induced magnetic excitations, the skin effects of the electrically conductive metal casing require that low frequencies be used.

A method for measuring shear wave velocity in a cased borehole is disclosed in U.S. Pat. No. 6,850,168 to Tang et al. A transmitter is operated at a frequency below a cut-off frequency of a signal propagating through the drill collar so that the signal received at receiver is uncontaminated by the collar mode. The cut-off frequency is determined by the thickness of the drill collar. In a preferred embodiment, the transmitter is a quadrupole transmitter. The quadrupole mode in the collar has a cut-off frequency that is higher than the quadrupole mode in the formation, so that operating a quadrupole transmitter below this cut-off frequency gives a signal relatively uncontaminated by the tool mode.

Measurements based on the velocity of acoustic waves through an earth formation in the presence of an applied magnetic field can yield useful information concerning a parameter of the earth formation. As the wellbore casing is generally electrically conductive, there is a need for addressing the presence of the casing in electrical measurements.

SUMMARY OF THE DISCLOSURE

In accordance with the present disclosure, an apparatus, a machine-readable medium, and a method are disclosed for determining a resistivity parameter of an earth formation adjacent to a borehole having a casing therein. In one aspect, the present disclosure provides a method of determining a first velocity of propagation of a first acoustic wave in the earth formation in the absence of an applied magnetic field, applying the applied magnetic field to the earth formation through the casing, determining a second velocity of propagation of a second acoustic wave in the earth formation in the presence of the applied magnetic field, and determining the resistivity parameter of the earth formation from the first velocity of propagation and the second velocity of propagation.

The method further includes determining the first velocity of propagation of at least one of a compressional acoustic wave and a shear acoustic wave. The method further includes determining the first velocity of propagation of a compressional acoustic wave. The magnetic field may be applied using at least one of 1) at least one permanent magnet and 2) at least one electromagnet. The method further includes applying the applied magnetic field to the earth formation through the casing using at least one electromagnet. The magnetic field may be applied in a first direction substantially perpendicular to a second direction of propagation of the second acoustic wave.

The method further includes determining the second velocity of propagation of at least one of a compressional acoustic wave and a shear acoustic wave. The method further includes determining the second velocity of propagation of a compressional acoustic wave. In one aspect, the second velocity of propagation of the second acoustic wave includes a continuous excitation of the first acoustic wave. The resistivity parameter of the earth formation may be determined by processing at least one difference between the first velocity of propagation and the second velocity of propagation.

The disclosure also provides an apparatus for determining a resistivity parameter of an earth formation adjacent to a borehole having a casing therein. The apparatus includes at least one acoustic transducer capable of exciting a first acoustic wave in the earth formation and a second acoustic wave in the earth formation; at least one acoustic receiver capable of determining a first velocity of propagation of the first acoustic wave in the absence of an applied magnetic field; a magnetic field generator capable of applying the applied magnetic field to the earth formation through the casing, wherein the at least one acoustic receiver is capable of determining a second velocity of propagation of a second acoustic wave in the earth formation in the presence of the applied magnetic field; and at least one processor capable of determining the resistivity parameter of the earth formation from the first velocity of propagation and the second velocity of propagation.

The first acoustic wave may include at least one of a compressional acoustic wave and a shear acoustic wave. At least one acoustic receiver determines the first velocity of propagation of the first acoustic wave. The magnetic field generator includes at least one of 1) at least one permanent magnet and 2) at least one electromagnet. The magnetic field generator is capable of applying the applied magnetic field to the earth formation through the casing in a first direction substantially perpendicular to a second direction of propagation of the second acoustic wave.

The apparatus further includes at least one acoustic receiver capable of determining the second velocity of propagation of the second acoustic wave, including a continuous excitation of the first acoustic wave in the earth formation. A processor is capable of processing at least one difference between the first velocity of propagation and the second velocity of propagation. The apparatus may be a component of a wireline measurement tool system further including a wireline and a rig capable of conveying the apparatus into the borehole having the casing therein.

The present disclosure also provides a machine-readable medium for use with an apparatus for determining a resistivity parameter of an earth formation adjacent to a borehole having a casing therein. The apparatus includes at least one acoustic transducer capable of exciting a first acoustic wave in the earth formation and a second acoustic wave in the earth formation; at least one acoustic receiver capable of determining a first velocity of propagation of the first acoustic wave in the absence of an applied magnetic field; a magnetic field generator capable of applying the applied magnetic field to the earth formation through the casing, wherein the at least one acoustic receiver is capable of determining a second velocity of propagation of a second acoustic wave in the presence of the applied magnetic field; and at least one processor capable of determining the resistivity parameter of the earth formation from the first velocity of propagation and the second velocity of propagation. The machine-readable medium includes instructions that enable an information handling system to execute a method of determining the resistivity parameter of the earth formation adjacent to the borehole having the casing therein, the method including determining a first velocity of propagation of a first acoustic wave in the absence of an applied magnetic field, applying the applied magnetic field to the earth formation through the casing, determining a second velocity of propagation of a second acoustic wave in the presence of the applied magnetic field, and determining the resistivity parameter of the earth formation from the first velocity of propagation and the second velocity of propagation. The machine-readable medium may further include at least one of: (i) a read-only memory (ROM), (ii) a programmable read-only memory (PROM), (iii) an electrically programmable read-only memory (EPROM), (iv) an electrically alterable read-only memory (EAROM), (v) an electrically erasable and programmable read-only memory (EEPROM), (vi) a flash memory, (vii) an optical disk, (viii) a hard drive, (ix) an iPod®, and (x) a non-volatile read-write memory (NOVRAM).

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein:

It is to be noted, however, that the appended drawings illustrate only typical embodiments of the present claimed subject matter and are, therefore, not to be considered as limiting the scope of the present claimed subject matter, as the present claimed subject matter may admit to other equally effective embodiments.

DETAILED DESCRIPTION OF THE DISCLOSURE

Illustrative embodiments of the present claimed subject matter are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such a development effort might be complex and time-consuming, but would nevertheless be a routine undertaking for those of ordinary skill in the art having the benefit of the present disclosure.

Figure 1:
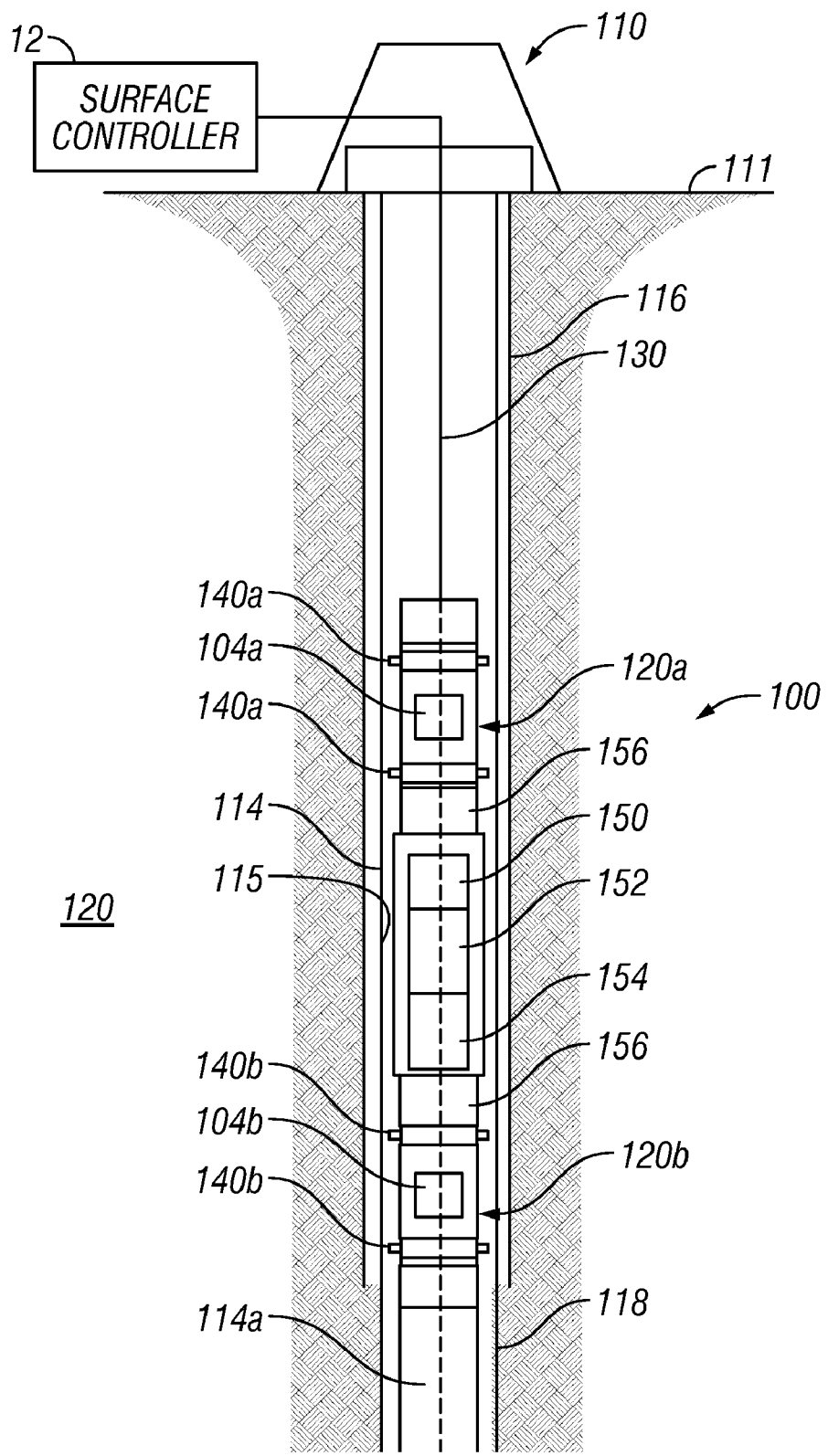
FIG. 1 shows an exemplary apparatus suitable for performing the method of the present disclosure conveyed within a wellbore having a casing.

FIG. 1 shows an exemplary apparatus suitable for performing the method of the present disclosure conveyed within a wellbore having a casing. FIG. 1 shows a rig 110 on a surface 111 and positioned over a subterranean earth formation of interest 120. The rig 110 may be a part of a land well production/construction facility or an offshore well production/construction facility. A wellbore 114 formed below the rig 110 may include a cased portion 116 and/or an open hole portion 118. In certain instances (e.g., during drilling, completion, work-over, and the like), a logging operation may be conducted to collect information relating to the earth formation 120 and/or the wellbore 114. Typically, a tool system 100 may be conveyed downhole via an umbilical 130 to measure one or more parameters of interest relating to the earth formation 120, such as resistivity. The term "umbilical" as used hereinafter includes a cable, a wireline, slickline, drill pipe, coiled tubing, or other devices suitable for conveying the tool system 100 into the wellbore 114. The tool system 100 may include one or more modules 102a, 102b each of which has a tool or a plurality of tools 104a, 104b adapted to perform one or more downhole tasks. The term "module" includes a device such as a sonde or sub that is suited to enclose or otherwise support a device that is to be deployed into the wellbore. While two proximally positioned modules and two associated tools are shown, it should be understood that any finite number may be used.

The tool 104a may be a formation evaluation (FE) tool adapted to measure one or more parameters of interest relating to the earth formation and/or the wellbore. The term formation evaluation (FE) tool encompasses measurement devices, sensors, and other like devices that, actively or passively, collect data about the various characteristics of the earth formation 120, directional sensors for providing information about the tool system 100 orientation or direction of movement, formation testing sensors for providing information about the characteristics of the reservoir fluid or for evaluating the reservoir conditions. The formation evaluation (FE) sensors may include resistivity sensors for determining the earth formation 120 resistivity or dielectric constant of the earth formation or the presence or absence of hydrocarbons; acoustic sensors for determining the acoustic porosity of the earth formation and the bed boundary in the earth formation; nuclear sensors for determining density of the earth formation, nuclear porosity and/or certain rock characteristics; or nuclear magnetic resonance (NMR) sensors for determining the porosity and/or other petrophysical characteristics of the earth formation. The direction and position sensors may include a combination of one or more accelerometers, gyroscopes, or magnetometers. The accelerometers preferably may provide measurements along three axes, in particular along three substantially mutually perpendicular axes. The formation testing sensors may collect earth formation fluid samples and determine the properties of the fluid, which may include physical or chemical properties. Pressure measurements may provide information about certain characteristics of the reservoir.

The tool system 100 may include telemetry equipment 150, a local or downhole processor or controller 152, and a downhole power supply 154. The telemetry equipment 150 may provide two-way communication for exchanging data signals between a surface controller or processor 112 and the tool system, as well as for transmitting control signals from the surface controller to the tool system.

A first module 102a may include a first tool 104a configured to measure a first parameter of interest and a second module 102b may include a second tool 104b that is configured to measure a second parameter of interest. In order to execute their assigned tasks, the first tool and the second tool may be in different positions. The positions can be with reference to an object such as the wellbore 114, a wellbore wall 115, or other proximally positioned tooling. The term "position" may be understood to encompass a radial position, an inclination, and/or an azimuthal orientation. In the illustration of FIG. 1, the longitudinal axis 114a of the wellbore ("the wellbore axis") is used as a reference axis to describe the relative radial positioning of the tools 104a, 104b. Other objects or points may also be used as a reference frame against which movement or position can be described. Moreover, the tasks of the tools may change during a wellbore-related operation. Generally speaking, the tool may be adapted to execute a selected task based on one or more selected factors. These factors may include, but may not be limited to depth, time, changes in earth formation characteristics, and/or the changes in tasks of other tools.

In an exemplary embodiment, the modules 102a and 102b may each be provided with positioning devices 140a, 140b, respectively, which are configured to maintain the respective modules 102a, 102b at selected radial positions relative to a reference position (e.g., the wellbore axis 114a). The positioning devices may also adjust the radial positions of the respective modules upon receiving one or more surface command signals or automatically in a closed-loop type manner. These selected radial positions may be maintained or adjusted independently of the radial position(s) of an adjacent downhole device (e.g., measurement tools, sonde, module, sub, or other like equipment). An articulated member, such a flexible joint 156 that couples the respective modules to the tool system may provide a degree of bending or pivoting to accommodate the radial positioning differences between adjacent modules or other equipment (for example, a processor sonde). One or more of the positioning devices may have fixed positioning members.

Figure 2:
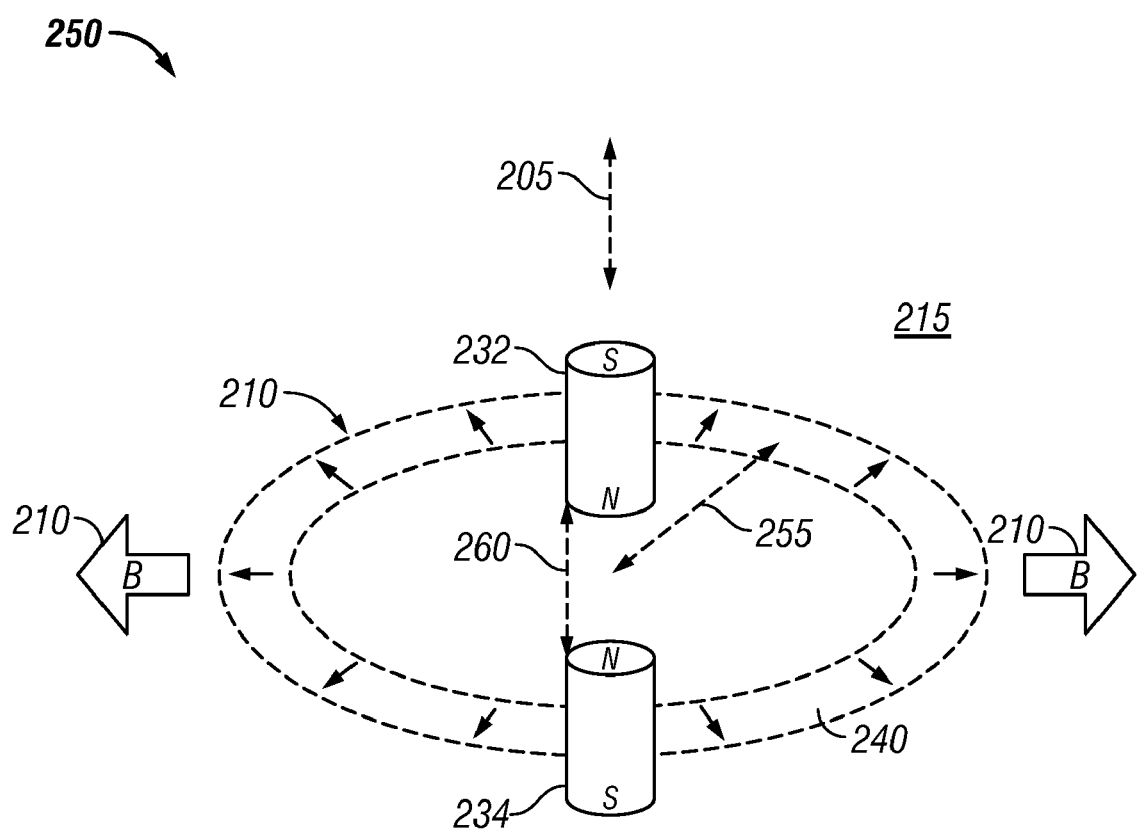
FIG. 2 schematically illustrates a magnet configuration of a resistivity apparatus suitable for use with the present disclosure.
Figure 3:
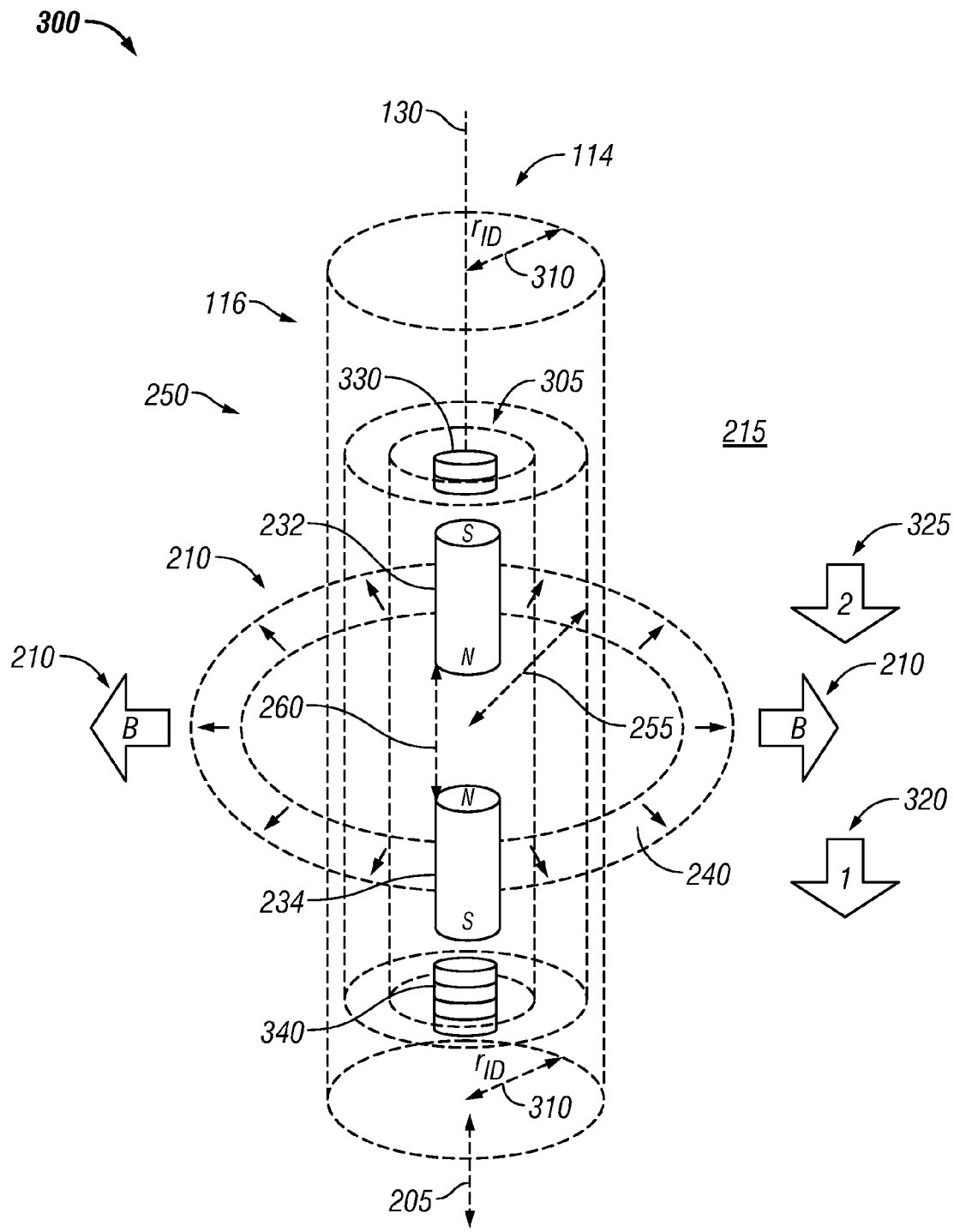
FIG. 3 schematically illustrates a resistivity apparatus suitable for use with the present invention, having the magnet configuration of FIG. 2.

FIG. 2 and FIG. 3 illustrate a magnetic field generator 250 of an illustrative resistivity device 305 suitable for use with the exemplary embodiment. One or more of magnets 232 and 234 may be magnetized in an axial direction along a vertical axis 205. The magnet may be positioned in opposing directions, with same magnetic poles, such as the north magnetic poles of the two magnets facing one another, thereby producing a toroidal region 240 of substantially homogeneous radial magnetic field 210 substantially perpendicular to the pair of axially aligned magnets. The one or more of the magnets may be electromagnets or permanent magnets. The applied static magnetic field may be generated using the one or more magnets. The orientation of the one or more magnets may be switched to reverse the orientation of the applied static magnetic field.

Distance 255 from substantially the middle of the toroidal region 240 to the vertical axis 205 may depend upon a distance 260 between respective faces of the like poles of the magnets 232 and 234. Rock pores (not shown) in an earth formation 215 may be filled with a fluid, such as water or hydrocarbons.

Figure 4:
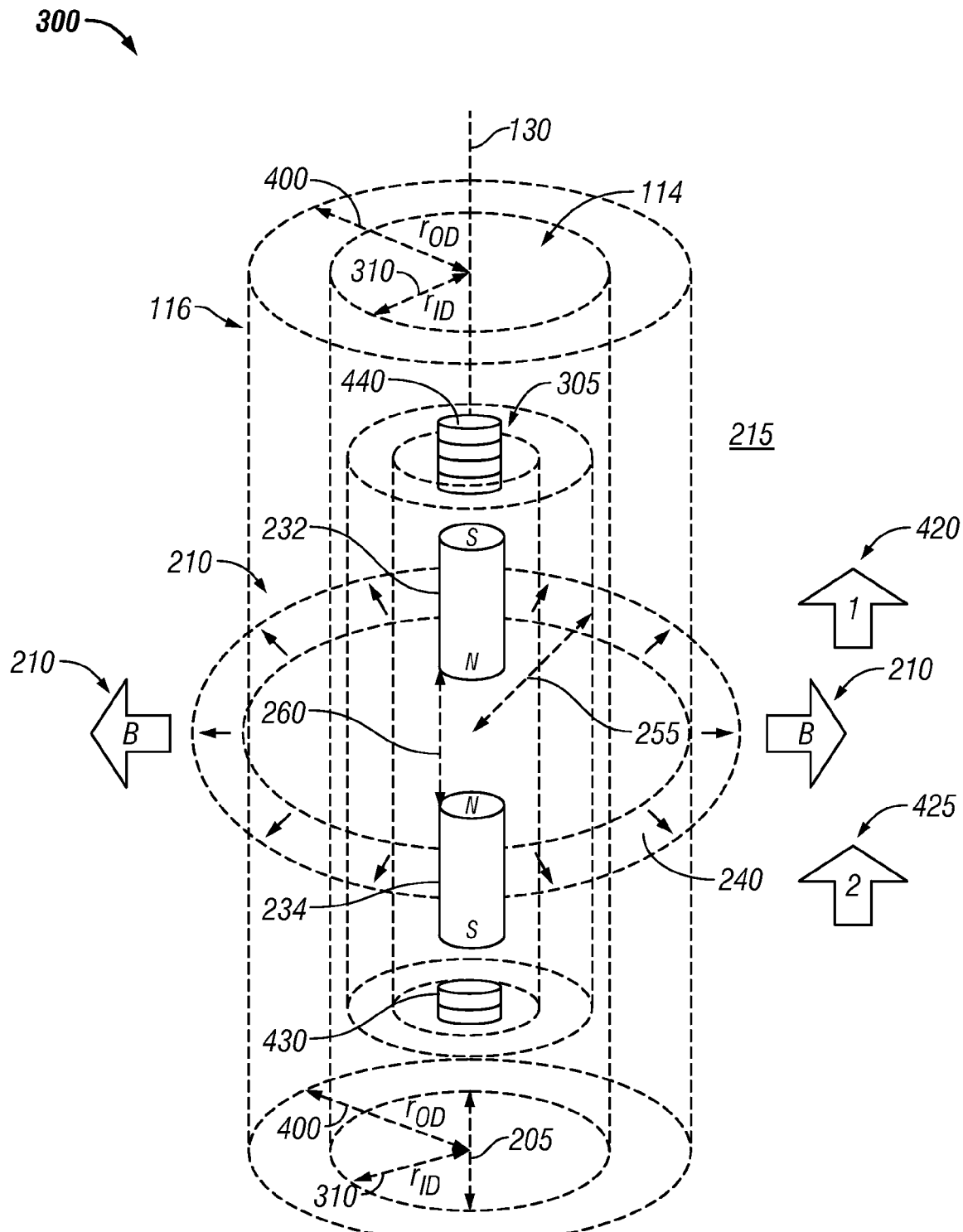
FIG. 4 schematically illustrates the resistivity apparatus of FIG. 3 having been conveyed into a wellbore having an electrically conductive casing therein.

Referring next to FIG. 3 and FIG. 4, the illustrative resistivity device 305 may include one or more acoustic transducers 330, 430 capable of exciting a first acoustic wave 320, 420, respectively, in the earth formation 215 and a second acoustic wave 325, 425, respectively, in the earth formation. In one aspect, the first and second acoustic waves may include compressional waves (P-waves) or shear waves (S-waves). The resistivity device 305 may also include one or more acoustic receivers 340, 440 capable of determining a first velocity of propagation of the first acoustic wave in the absence of the applied magnetic field. The resistivity device 305 may also include a magnetic field generator 250 capable of applying the magnetic field 210 to the earth formation through the electrically conductive casing 116, wherein the one or more acoustic receivers 340, 440 may be capable of determining a second velocity of propagation of a second acoustic wave 325, 425, respectively in the presence of the applied magnetic field 210. The resistivity device 305 may also include the one or more processors (112, 152 of FIG. 1) capable of determining the resistivity parameter of the earth formation 215 from the first velocity of propagation and the second velocity of propagation.

Alternatively, the S-waves and P-waves may be produced using a multipole source, such as a monopole source or a quadrupole source, such as is described in "Compressional and shear-wave logging in open and cased holes using a multipole tool," by Chen et al, Geophysics, Vol. 56, No. 4, April, 1991.

The illustrative resistivity device 305 may be a component of a wireline measurement tool system 300 further including the wireline 130 and the rig 110 (FIG. 1) capable of conveying the resistivity device 305 into the borehole 114. The electrically conductive casing 116 may have an inner radius $r_{ID}$, as shown at 310, for example, in FIG. 3. The electrically conductive casing 116 may have an outer radius $r_{OD}$, as shown at 400, for example, in FIG. 4.

The one or more acoustic transducers excite the first acoustic wave including a compressional acoustic wave (also known as a P-wave) and/or a shear acoustic wave (also known as an S-wave). One or more acoustic receivers determine the first velocity of propagation of the first acoustic wave. A magnetic field generator 250 such as permanent magnets and/or electromagnets applies the applied magnetic field to the earth formation through the electrically conductive casing in a first direction substantially perpendicular to a second direction of propagation of the second acoustic wave.

The one or more acoustic receivers determine the second velocity of propagation of the second acoustic wave. The one or more processors 112, 152 (FIG. 1) process at least one difference between the first velocity of propagation of the first acoustic wave and the second velocity of propagation of the second acoustic wave. The Lorentz acoustic effect may give rise to at least one difference between the first velocity of propagation of the first acoustic wave and the second velocity of propagation of the second acoustic wave.

The one or more acoustic response signals received by the one or more acoustic receivers may be sent to the surface for processing by the surface processor 112, for example, or may be processed by the downhole processor 152. Other variations for conducting appropriate resistivity measurements would be known to those versed in the art, having the benefit of the present disclosure, and any of these may be used in the disclosed embodiments. The basic acoustic well logging configurations or structures, having one or more acoustic transducers or one or more acoustic receivers are described, for example, in U.S. Pat. No. 4,649,526 to Winbow et al., the contents of which are fully incorporated herein by reference.

In an exemplary embodiment, an incident acoustic wave 325, 425 may be used in the presence of the static magnetic field 210 to excite an acoustic effect. The interaction of magnetic fields and elastic waves in porous media are due to the Lorentz force acting on charged particles while the charged particles vibrate in an acoustic wave. For simplicity of notation, all of these effects may be called "the Lorentz acoustic effect." The magnitude of the Lorentz acoustic effect in the particle and wave velocities may depend on the electrical parameters of a porous earth formation, such as the earth formation 215. Since the applied magnetic field 210 is static, there may not be an appreciable skin-effect in the electrically conductive casing 116, or in any electrically conductive fluids in the wellbore 114, and thus the applied magnetic field may penetrate through the electrically conductive casing and any electrically conductive fluids in the wellbore with substantially no decay. By exciting the acoustic waves in the cased wellbore, both with (the H-mode acoustic waves) and without (the N-mode acoustic waves) the applied static magnetic field and measuring the difference of wave velocities in both cases, information may be obtained about the earth formation resistivity. The conductivity of the casing and associated skin-effects may not be an issue, since the resistivity information is generally embedded into the properties of acoustic waves due to the Lorentz acoustic effect. The physics of the Lorentz acoustic effect may be analyzed using a simplified model and the magnitude of the Lorentz acoustic effect may be estimated, as described in more detail below.

Figure 5:
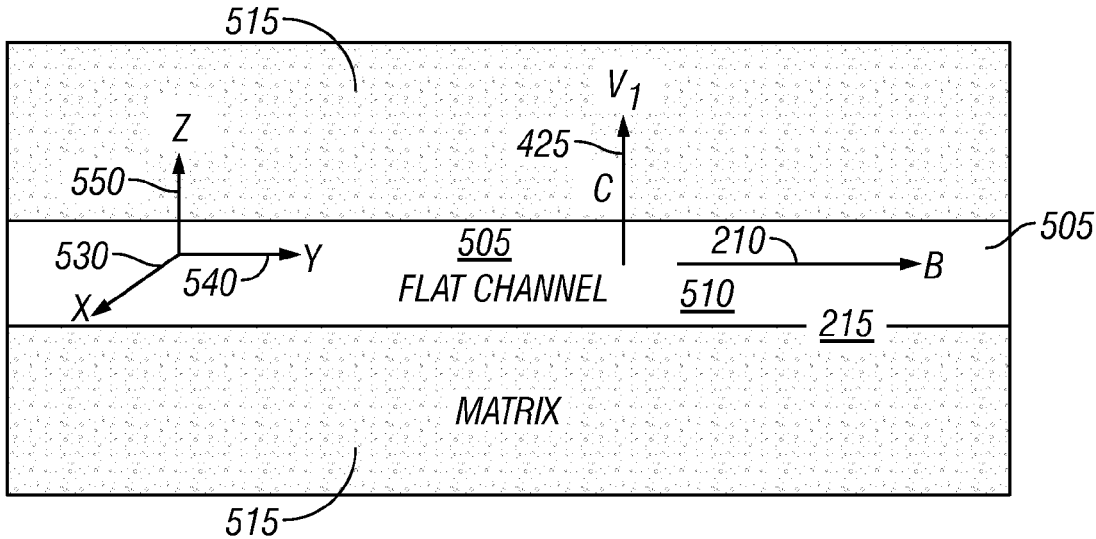
FIG. 5 schematically illustrates a simplified model showing the Lorentz acoustic effect.

FIG. 5 shows a model having a simplified earth formation 215 including a substantially uniform solid matrix 515 including a single flat channel 510 with dimensions in the X-direction, as shown at 530, and in the Y-direction, as shown at 540, that are much larger than the dimension in the Z-direction, as shown at 550. The single flat channel 510 may be filled with a conducting fluid 505, such as shown in FIG. 5. The plane compressional acoustic wave 425, labeled C, may propagate in the Z-direction. The static magnetic field 210 may be oriented in the Y-direction so that B=B$\hat{j}$, where $\hat{j}$ is the unit vector in the Y-direction. The particle motion in the conducting fluid 505 may be assumed to occur with the velocity $$v_1 = v_1^0 e^{i\omega t} \quad (1)$$

where $v_1^0$ is the magnitude of the amplitude of the particle velocity at t=0, $\omega=2\pi f$ is the angular (circular) frequency of the plane compressional acoustic wave 425, which has the frequency f.

Figure 6:
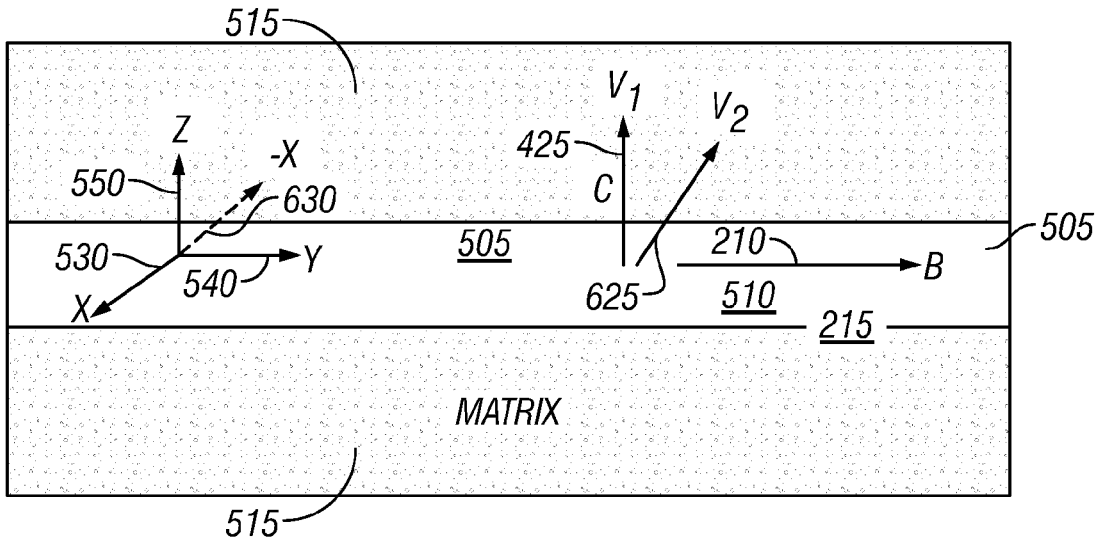
FIG. 6 schematically illustrates further aspects of the simplified model of FIG. 5.

A Lorentz force due to the presence of the static applied magnetic field may affect the charged particles in the conductive fluid, as shown in FIG. 6, for example. A charged particle movement may occur in the negative X-direction, as shown at 630, substantially perpendicular to both the static applied magnetic field 210 in the Y-direction and the Z-direction of the incident acoustic wave 425. Out of all the charged particles responsible for the conductivity of the conductive fluid 505, only the positive ions of one type may be considered, for the sake of simplicity of the model. Obtaining the result for a mixture of different ions may only be a technical matter, as would be appreciated by those of ordinary skill in the art, having the benefit of the present disclosure.

Assuming that the positive ions considered are involved in the acoustic motion and have a mass m and a charge e, the following expression for the Lorentz force $F_2$ may be obtained:

$$F_2 = e[v_1 \times B] \quad (2)$$

$$= e\left[\left(v_1^0 e^{i\omega t} \hat{k}\right) \times (B\hat{j})\right]$$

$$= -ev_1^0 B e^{i\omega t} \hat{i}$$

$$= m\frac{dv_2}{dt}$$

$$\equiv m\dot{v}_2$$

$$= -i\omega m v_2^0 e^{i\omega t} \hat{i}$$

assuming $v_2 = -v_2^0 e^{i\omega t}\hat{i}$, where $\hat{i}$ is the unit vector in the positive X-direction, as shown at 530, using $\hat{k} \times \hat{j} = -\hat{i}$, with the associated velocity of the charged particles $v_2$ given by:

$$v_2 = \frac{e[v_1 \times B]}{i\omega m} \quad (3)$$

$$= \frac{e\left[\left(v_1^0 e^{i\omega t} \hat{k}\right) \times (B\hat{j})\right]}{i\omega m}$$

$$= -\frac{e(v_1^0 B)}{i\omega m} e^{i\omega t} \hat{i}$$

$$= -v_2^0 e^{i\omega t} \hat{i}$$

where $$v_2^0 = \left|\frac{e(v_1^0 B)}{i\omega m}\right| = \frac{e(v_1^0 B)}{\omega m}$$

is the magnitude of the amplitude of the particle velocity at t=0 in the negative X-direction.

Figure 7:
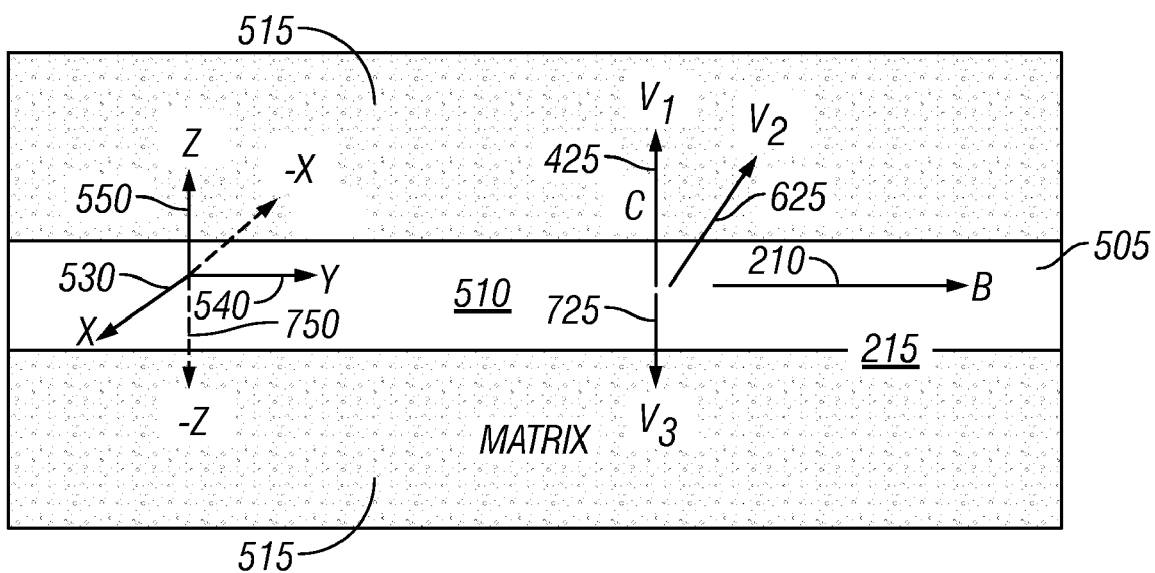
FIG. 7 schematically illustrates still further aspects of the simplified model of FIG. 5 and FIG. 6.

Similarly, the motion in the negative X-direction, as shown at 630, may create a motion, as shown in FIG. 7, for example, with the associated velocity $v_3$ in the negative Z-direction, as shown at 750, the direction opposite to the positive Z-direction, as shown at 550, of the incident acoustic wave 425C. The associated velocity of the charged particles $v_3$ may be given by:

$$v_3 = \frac{e[v_2 \times B]}{i\omega m} \quad (4)$$
$$= \frac{e[(-v_2^0 e^{i\omega t}\hat{i}) \times (B\hat{j})]}{i\omega m}$$
$$= -\frac{e(v_2^0 B)}{i\omega m} e^{i\omega t}\hat{k}$$
$$= -v_3^0 e^{i\omega t}\hat{k}$$

where $$v_3^0 = \left|\frac{e(v_2^0 B)}{i\omega m}\right| = \left(\frac{e}{\omega m}\right)^2 (v_1^0 B^2) = \left(\frac{eB}{\omega m}\right)^2 v_1^0 = \left(\frac{\omega_L}{\omega}\right)^2 v_1^0$$

is the magnitude of the amplitude of the particle velocity at t=0 in the negative Z-direction, as shown at 750

$$\omega_L \equiv \frac{eB}{m}$$

in FIG. 7, for example, and is defined to be the Larmor frequency of the moving charged particles.

In FIG. 7, the velocity of the particle movement in the incident acoustic wave 425 is shown to decrease due to the Lorentz acoustic effect. Equation (4) shows that: (1) there is a decrease of the particle velocity in the incident acoustic wave due to the Lorentz force; (2) the magnitude of the Lorentz acoustic effect does not depend on the direction of the static magnetic field; and (3) the Lorentz acoustic effect can be increased by increasing the static magnetic field. The direction of the static magnetic field may be switched between successive measurements, thereby substantially averaging out effects that may be due to inhomogeneities of the static magnetic field.

The Lorentz acoustic effect created by the movement of potassium ions (atomic weight=40, electric charge=1) may be estimated as follows:

$$\frac{v_3^0}{v_1^0} = \left(\frac{eB}{\omega m}\right)^2 \quad (5)$$

-continued
$$= \left(\frac{1.6 \cdot 10^{-19}(C) \cdot 1.256 \cdot 10^{-6}(\text{Henry/m}) \cdot H(A/m)}{6.28 \cdot f(\text{Hz}) \cdot 40 \cdot 1.67 \cdot 10^{-27} \text{ (kg)}}\right)^2$$
$$= \left(\frac{1.6 \cdot 10^{-19}(C) \cdot 1.256 \cdot 10^{-6}(\text{Henry/m}) \cdot H(A/m)}{6.28 \cdot 10^3 f(\text{kHz}) \cdot 40 \cdot 1.67 \cdot 10^{-27} \text{ (kg)}}\right)^2$$
$$\approx \left(0.0005 \frac{H(A/m)}{f(\text{kHz})}\right)^2$$

so that the estimated magnitude of the Lorentz acoustic effects created by the movement of potassium ions is:

$$\frac{v_3^0}{v_1^0} = \left(0.0005 \frac{H(A/m)}{f(\text{kHz})}\right)^2 \quad (6)$$

For the ratio of magnetic field to frequency of about $$\frac{H(A/m)}{f(\text{kHz})} \approx 1000, \quad (7)$$

the Lorentz acoustic effect is on the order of 25% for the velocity of particle movement. Similarly, for the ratio of magnetic field to frequency of about $$\frac{H(A/m)}{f(\text{kHz})} \approx 200 \quad (8)$$

the effect is about 1%. For the acoustic frequency of 0.1 kHz, the required magnetic field is about 200 A/m which is easily achievable in the near borehole zone, for example, with a long current line.

Satisfying Equation (8) deeper into formation may require a reduction of the acoustic frequency. If the acoustic frequency is taken to be about 10 Hz, then a static magnetic field of about 2 Amperes per meter (A/m) may be required in the earth formation. Such a field at a radial distance of about 1 meter may be produced, by a long current line with a current equal to about 12.5 Amperes (A).

To preserve the nature of the incident acoustic wave, the ratio of Larmor and acoustic frequencies should be kept substantially small. Otherwise, the acoustic motion may be unduly perturbed by the Larmor rotation. A useful rule of thumb may be provided by the following:

$$\frac{v_3^0}{v_1^0} = \left(\frac{eB}{\omega m}\right)^2 = \left(0.0005 \frac{H(A/m)}{f(\text{kHz})}\right)^2 = \left(\frac{0.5 H(A/m)}{f(\text{Hz})}\right)^2 \quad (9)$$

so that, for the potassium ions, every two Amperes per meter (A/m) of the static magnetic field increase may add about one Hz to the Larmor frequency.

The above-described Lorentz acoustic phenomena may be used to conduct resistivity measurements through the electrically conductive metal casing. Since the static magnetic field may penetrate the casing substantially without decay, the above-described Lorentz acoustic phenomena may be used for measuring resistivity through the casing. The electric charge e in Equation (4) may be substituted with the following expression using the conductivity of the fluid a, the volume density of the ions n, and the average velocity of the charged particles $\bar{v}$:

$$v_3^0 = \left(\frac{eB}{\omega m}\right)^2 v_1^0 = \left(\frac{\sigma B}{n\bar{v}\omega m}\right)^2 v_1^0 \quad (10)$$

where Equation (10) proves that the Lorentz acoustic effect on the compressional wave may be proportional to the square of the fluid conductivity $\sigma$.

Figure 8:
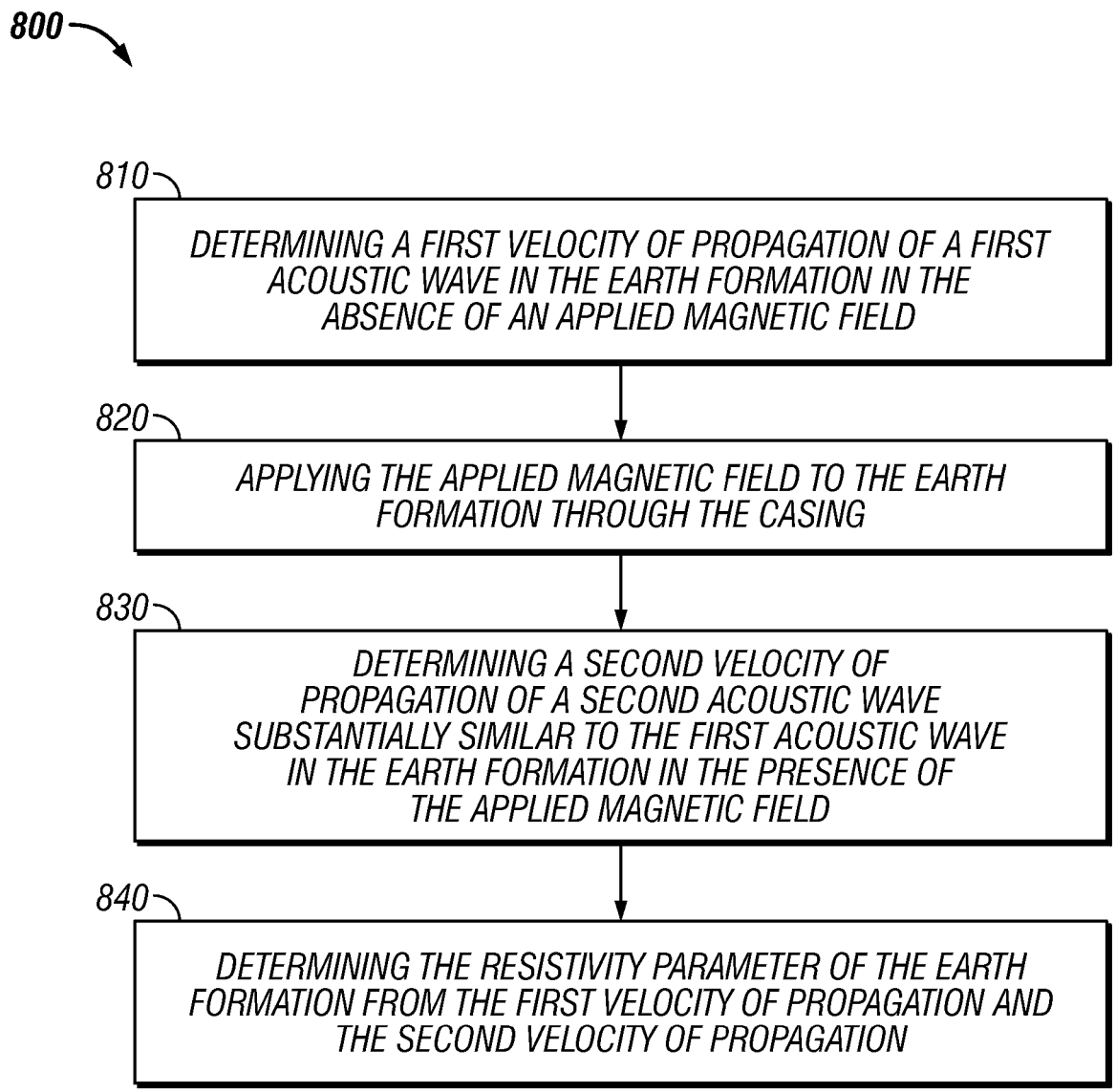
FIG. 8 schematically illustrates a method useful for improving resistivity measurement techniques downhole and determining a resistivity parameter of an earth formation adjacent to a borehole having a casing therein.

The present disclosure provides an apparatus, a machine-readable medium, and a method useful for determining a resistivity parameter of an earth formation adjacent to a borehole having a casing therein. As shown in FIG. 8, the present disclosure provides a method of determining a resistivity parameter of an earth formation adjacent to a borehole having a casing therein. The method may include determining a first velocity of propagation of a first acoustic wave in the earth formation in the absence of an applied magnetic field, as indicated at box 810. The method may also include applying the applied magnetic field to the earth formation through the casing, as indicated at box 820. The method may also include determining a second velocity of propagation of a second acoustic wave in the earth formation in the presence of the applied magnetic field, as indicated at box 830. The method may also include determining the resistivity parameter of the earth formation from the first velocity of propagation and the second velocity of propagation, as indicated at box 840.

The method may further include determining the first velocity of propagation of at least one of a compressional acoustic wave and a shear acoustic wave. In an exemplary embodiment, the method may further include determining the first velocity of propagation of a compressional acoustic wave. The applied magnetic field may be applied to the earth formation through the casing using a permanent magnet or an electromagnet. The method may further include applying the applied magnetic field to the earth formation through the casing using at least one electromagnet. In one aspect, the applied magnetic field is applied through the casing in a first direction substantially perpendicular to a second direction of propagation of the second acoustic wave.

The method may further include determining the second velocity of propagation of at least one of a compressional acoustic wave and a shear acoustic wave. The method may further include determining the second velocity of propagation of a compressional acoustic wave. The second acoustic wave may be a continuous excitation of the first acoustic wave. The method may further determine the resistivity parameter of the earth formation by processing at least one difference between the first velocity of propagation and the second velocity of propagation.

The method 800 may be implemented as follows: (1) one or more acoustic transducers may excite a first acoustic wave in the earth formation in the absence of a static magnetic field, which may be designated "the N-mode," since there is no static magnetic field present; (2) one or more acoustic receivers may measure the earth formation response in the N-mode; (3) a strong static magnetic field may be applied by the magnetic field generator in the direction substantially perpendicular to the direction of the first acoustic wave propagation, which may be designated "the H-mode," since there is the strong applied static magnetic field present; (4) the one or more acoustic transducers may excite the second acoustic wave in the earth formation in the H-mode, where either the second acoustic wave has substantially the same parameters as the first acoustic wave or, alternatively, the second acoustic wave may be a substantially continuous excitation of the first acoustic wave, in either case resulting in generating the above-described Lorentz acoustic effect in the earth formation; (5) the one or more acoustic receivers may measure the earth formation response for the second time in the H-mode; and (6) the difference of two measurements (N-mode and H-mode), may be interpreted by data processing using one or more processors. In these various illustrative embodiments, the two measurements may be different only if the pores in the earth formation are filled with a conductive fluid.

The influence of an electrically conductive metal casing on the measurements may be expected to be substantially negligible due to the following factors: (i) the arrivals of the first acoustic waves and/or the second acoustic waves propagating via the casing and through the earth formation may be separated in time; (ii) the effects of inhomogeneities of the casing may be calibrated out due to the differential nature of the proposed measurement technique; and (iii) the ranges of the frequencies of the first acoustic waves and the second acoustic waves and/or the ranges of the applied static magnetic field ranges may be dynamically selected to maintain substantially similar acoustic modes in the casing for both excitations in the N-mode and the H-mode. In various alternative embodiments, (1) the electrically conductive metal casing may be substantially demagnetized; (2) the applied static magnetic field may be created using electromagnets including one or more current coils, current lines, and static permanent magnets; (3) the first and second acoustic waves may be different types of acoustic waves, for example, compressional and/or shear waves in a combination with different types of the applied static magnetic field oriented either along the borehole or perpendicular to the wellbore axis; and (4) different types of measurements may be made, such as either a measurement of the first arrivals which separate the acoustic waves or a differential measurement having a dynamic compensation of the response in the absence of the applied static magnetic field.

The apparatus, machine-readable medium, and method disclosed herein may be advantageous in providing resistivity measurements of the formation that are conducted through the electrically conductive metal casing without the very small magnitudes of the measured resistivity signals that present significant challenges in currently existing galvanic methodologies. Another advantage is in providing resistivity measurements of the formation that are conducted through the electrically conductive metal casing without skin effects of the electrically conductive metal casing that require the restrictive use of very low frequencies.

As noted above, determination of resistivity through a steel pipe has numerous applications such as locating bypassed oil and gas, reservoir evaluation, monitoring water floods, measuring quantitative saturations, cement evaluation; permeability measurements, and measurements through a drill string attached to a drilling bit. Bypassed oil and gas can be readily identified due to its high resistivity. The basic principles of reservoir evaluation also rely on differences in resistivity between hydrocarbon-saturated and water-saturated zones. In a secondary recovery operation using waterflood, resistivity measurements can provide warning of imminent "break-through" of injected water. Quantitative saturation also depends on measurements of formation resistivity. Integrity of cementing operations can be evaluated by the absence of water outside the casing. In all such applications, it would be common practice to make log of the resistivity parameter, and store results of the measurements on a suitable medium.

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present claimed subject matter. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed is:

1. A method of determining a resistivity parameter of an earth formation adjacent to a borehole having a casing therein, the method including:
   using at least one acoustic transducer for generating a first acoustic wave in the formation and determining a first velocity of propagation of a the first acoustic wave in the earth formation in the absence of an applied magnetic field;
   using a magnetic field generator for applying the applied magnetic field to the earth formation through the casing;
   determining a second velocity of propagation of a second acoustic wave generated in the earth formation by the at least one acoustic transducer in the presence of the applied magnetic field; and
   using a processor for determining the resistivity parameter of the earth formation from the first velocity of propagation and the second velocity of propagation.

2. The method of claim 1, wherein determining the first velocity of propagation of the first acoustic wave further includes determining the first velocity of propagation of at least one of: (i) a compressional wave, and (ii) a shear wave.

3. The method of claim 1, wherein the resistivity parameter comprises at least one of: (i) a conductivity, and (ii) a resistivity.

4. The method of claim 1, wherein applying the applied magnetic field to the earth formation through the casing further includes applying the applied magnetic field to the earth formation through the casing using at least one of (i) at least one permanent magnet, and (ii) at least one electromagnet.

5. The method of claim 1, wherein applying the applied magnetic field to the earth formation through the casing further includes applying the applied magnetic field to the earth formation through the casing in a first direction substantially perpendicular to a second direction of propagation of the second acoustic wave.

6. The method of claim 1, wherein determining the second velocity of propagation of the second acoustic wave further includes determining the second velocity of propagation of at least one of: (i) a compressional wave, and (ii) a shear wave.

7. The method of claim 1, wherein determining the second velocity of propagation of the second acoustic wave further includes determining the second velocity of propagation of the second acoustic wave including a continuous excitation of the first acoustic wave in the earth formation.

8. The method of claim 1, wherein determining the resistivity parameter of the earth formation from the first velocity of propagation and the second velocity of propagation further includes processing at least one difference between the first velocity of propagation and the second velocity of propagation.

9. The method of claim 1 further comprising selecting a frequency of the first acoustic wave and a second acoustic wave to be substantially less than a Larmor frequency of the formation.

10. The method of claim 1 further comprising using the determined resistivity parameter for at least one of: (i) locating bypassed hydrocarbons, (ii) reservoir evaluation, (iii) monitoring a waterflood operation, (iv) measuring a fluid saturation, (v) cement evaluation, and (vi) permeability evaluation.

* * * * *